J. H. SEBALD.
PUMP VALVE POT.
APPLICATION FILED JULY 24, 1909.

1,133,406.

Patented Mar. 30, 1915.

Witnesses:
P. N. Tilden
S. E. Brown

Inventor:
Joseph H. Sebald
by his Attys.

UNITED STATES PATENT OFFICE.

JOSEPH H. SEBALD, OF ARLINGTON, NEW JERSEY, ASSIGNOR TO HENRY R. WORTHINGTON, OF NEW YORK, N. Y., A CORPORATION OF NEW JERSEY.

PUMP VALVE-POT.

1,133,406.        Specification of Letters Patent.        Patented Mar. 30, 1915.

Application filed July 24, 1909.   Serial No. 509,387.

*To all whom it may concern:*

Be it known that I, JOSEPH H. SEBALD, a citizen of the United States, residing at Arlington, county of Essex and State of New Jersey, have invented certain new and useful Improvements in Pump Valve-Pots, fully described and represented in the following specification and the accompanying drawings, forming a part of the same.

This invention relates especially to an improved valve pot for pumps, the especial object being to provide a compact and simple construction of valve pot and valves which shall secure the maximum area for passage of the liquid within a valve pot of given dimension, and which shall be strong, cheap and convenient of manufacture, and provide for direct flow of the liquid and ready access to the valves.

I secure the desired results by a novel construction of valve pot and valve cage, by which a large number of small automatic valves are grouped within a limited space, the valves being arranged in successive tiers in the valve cage, so that a large number of valves may be grouped within a small casing, and so arranged as to secure great strength and a construction simple and convenient of manufacture.

As a full understanding of the invention can best be given by a detailed description of a construction embodying the same, such a description will now be given in connection with the accompanying drawings, illustrating the preferred form of valve pot embodying all the features of the invention and the features forming the invention then specifically pointed out in the claims.

Figure 1:
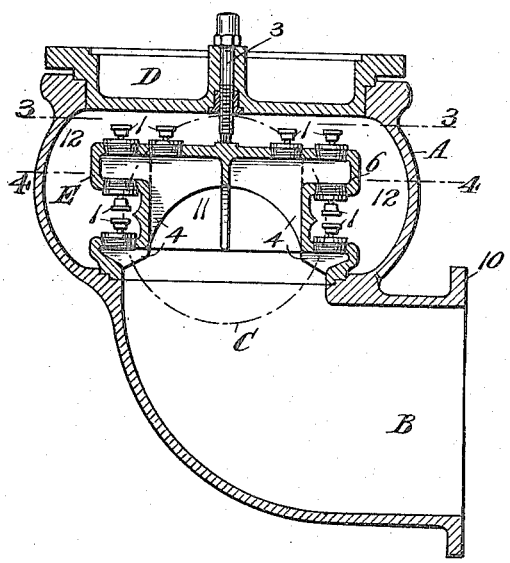
Figure 2:
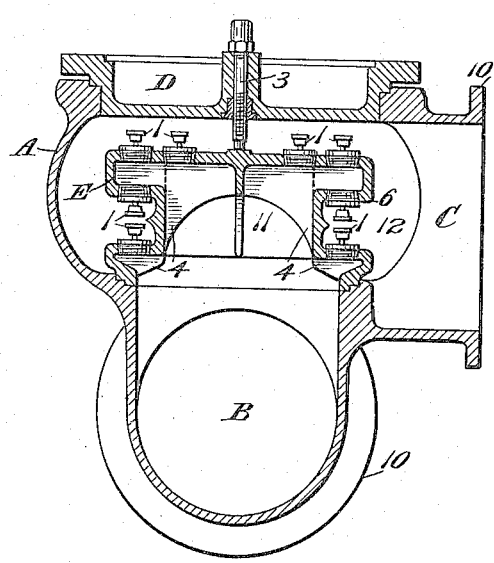
Figure 3:
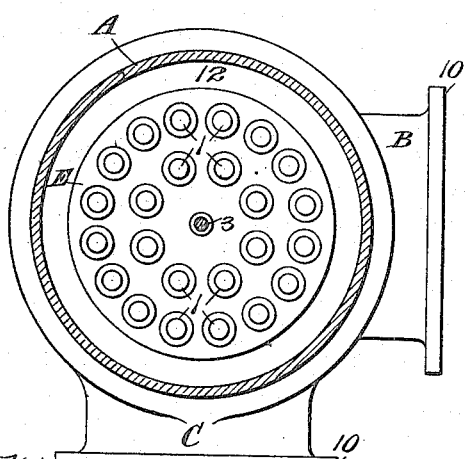
Figure 4:
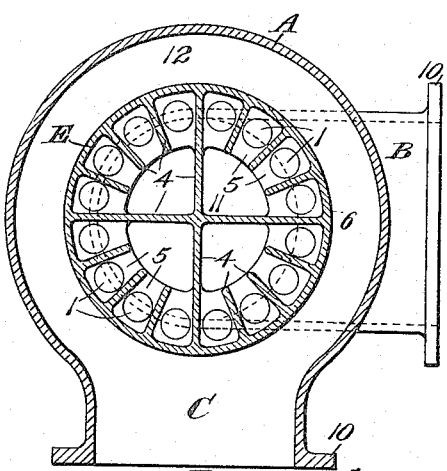

In the drawings: Figure 1 is a vertical central section of the preferred form of valve pot taken through the inlet pipe. Fig. 2 is a central section at right angles to Fig. 1. Figs. 3 and 4 are horizontal sections on the lines 3 and 4 of Fig. 1.

Referring to said drawings, A is the outer casing of the valve pot, B the inlet and C the outlet, the inlet and outlet being shown with the usual flanges 10 for pipe connections, and D the cap closing the open top of casing A through which open top free access to the valves is provided. The inlet B opens up into the suction chamber 11 formed within the valve cage E which receives the valves, this cage E thus forming the suction chamber 11 within the cage, and the delivery chamber 12 between the cage E and the valve pot casing A, the former connecting with the inlet and the latter with the outlet.

The cage E is provided with an annular series of openings and seats for automatic valves 1, which are shown as of a common form. The valves of these annular sets are arranged in line with each other and open longitudinally of the cage, that is, vertically in the valve pot construction shown, three vertically arranged sets being shown in the construction, and this is the number of sets preferred, although this number may be varied. This arrangement is made possible, and the maximum number of sets of valves within a given vertical space secured by the construction shown, in which the cage is formed with annular valve chambers, the upper and lower walls of which form annular valve seats, these chambers 6 being separated sufficiently to allow the valves in adjacent chambers to open toward each other between the chambers, the valves thus opening outwardly from the cage. This arrangement, in which the suction is to the interior of the cage and the discharge from outside the cage, so that the valves open outwardly, is important in that the valve cage is subjected to compression strains only and not tension strains, as would be the case if the discharge were from the inner side of the cage. The strength required can thus be secured with light metal, and the valve cage may be used with very high pressures. The same construction of valve cage, however, may be used with the valves arranged so as to open inwardly, and such construction, while not securing equal strength for weight of metal and less desirable in other respects than the arrangement shown, is included within the broader features of the invention.

The cage E with the valves is set into the valve pot casing A, seating at the base of the casing, and is shown as held in position by screw 3 passing through the cap D and bearing against the top of the cage E. In the construction shown the cage E is made of one piece and provided with ribs 4 between the valves which strengthen the construction and divide the valve chambers into valve cells 5, but the cage may be made in cylindrical sections seated on each other, if desired. Two annular sets of valves are shown in the top plate of the cage E, this being permitted by the size of the top plate.

This, however, is not essential to the present invention. It will be seen that this valve cage provides a very compact construction, with a large number of valves within a given space, and the valve openings of the different sets of valves are in line, so that they may all be bored at one operation in manufacture with the valves opening outwardly, as shown. The valve seats may be faced after they are all placed. The valve pot and cage, also, secure great strength with light metal, and provide for a large direct flow, so that a small light valve pot may be used for high pressures and large capacity. The valves are readily accessible and the valve cage readily removable through the top of the valve pot when the cap D is removed. This construction of valve cage is applicable, not only to valve pots as shown, but also in pump cylinders, and in itself forms a part of the invention.

What I claim is:—

1. A pump valve pot consisting of an outer casing having inlet and outlet connections, a valve cage within the casing dividing the valve pot into an inlet chamber within the cage and an outlet chamber outside the cage, and annular sets of valves in the valve cage opening longitudinally of the cage, the successive sets of valves being arranged longitudinally of the cage and with the valves of the different sets in line with each other.

2. A valve cage formed to inclose a fluid chamber and having a series of annular valve chambers around the cage open to the fluid chamber and annular sets of valves in the opposite walls of said chambers opening longitudinally of the cage.

3. A valve cage formed to inclose a fluid chamber and having a series of annular valve chambers around the cage open to the fluid chamber and annular sets of valves in the opposite walls of said chambers opening longitudinally of the cage with the valves of the different sets in line with each other.

4. A valve cage formed to inclose a fluid chamber and having annular valve chambers around the cage open to the fluid chamber and annular sets of valves in said chambers opening longitudinally of the cage with the valve of the successive sets arranged in line with each other.

5. A valve cage formed to inclose a fluid chamber and having annular valve chambers around the cage open to the fluid chamber, and annular sets of valves in said chambers opening longitudinally of and outwardly from the cage with the valves of the successive sets arranged in line with each other.

6. A valve cage formed to inclose a fluid chamber and having annular valve chambers around the cage open to the fluid chamber, the valve chambers being separated sufficiently to allow adjacent sets of valves to open toward each other within the annular space between the valve chambers, and annular sets of valves in the opposite walls of said chambers opening longitudinally of and outwardly from the cage.

7. A valve cage formed to inclose a fluid chamber and having a valve chamber extending around the cage and open to said fluid chamber, said valve chamber having opposite side walls extending transversely to the cage, valve seats in said opposite walls of the chamber, and sets of valves in said seats opening longitudinally of the cage.

In testimony whereof, I have hereunto set my hand, in the presence of two subscribing witnesses.

JOSEPH H. SEBALD.

Witnesses:
Wm. Schwanhauser,
E. F. Walker.

Copies of this patent may be obtained for five cents each, by addressing the "Commissioner of Patents, Washington, D. C."